United States Patent [19]
Harrison et al.

[11] Patent Number: 5,272,803
[45] Date of Patent: Dec. 28, 1993

[54] METHOD AND APPARATUS FOR ELECTRIC MOTOR ASSEMBLY WITH BEARING PRELOAD

[75] Inventors: Richard Harrison, Aurora; Lei Sun, Tualatin, both of Oreg.

[73] Assignee: Synektron Corporation, Portland, Oreg.

[21] Appl. No.: 14,342

[22] Filed: Feb. 5, 1993

[51] Int. Cl.$^5$ .................... H02K 15/02; H02K 15/10
[52] U.S. Cl. ........................... 29/596; 29/469; 29/732
[58] Field of Search ............. 29/596, 598, 732, 733, 29/736, 469

[56] References Cited

U.S. PATENT DOCUMENTS

3,538,598  11/1970  Wightman et al. ............... 29/596
4,048,717  9/1977  Piette ............................. 29/732

*Primary Examiner*—Carl E. Hall
*Attorney, Agent, or Firm*—Chernoff, Vilhauer, McClung & Stenzel

[57] ABSTRACT

A press fit machine for assembling an electric motor which includes a hub having an upper bearing and a stator assembly having a lower bearing, includes an upper and lower press fit fixtures for holding the hub and stator respectively in a preloaded condition prior to motor assembly and for a predetermined period of time afterward. The machine press fits the two halves of the motor together while maintaining appropriate preloads on the upper and lower bearings to prevent excess looseness in the bearings or excessive stiffness. The preload ensures that the bearing will function correctly after assembly because it is maintained during a period of time that the glue joining the hub and stator assembly together sets.

12 Claims, 11 Drawing Sheets

METHOD AND APPARATUS FOR ELECTRIC MOTOR ASSEMBLY WITH BEARING PRELOAD

BACKGROUND OF THE PRESENT INVENTION

The present invention relates to a method and apparatus for assembling electric motors and in particular includes a provision for preloading the bearings of the electric motor during assembly.

Electric motors are generally manufactured in two major parts. A rotary hub assembly houses permanent magnet members and encloses a stator assembly which includes stator coils surrounding an electromagnet. The hub assembly is joined to the stator assembly which includes a rotor shaft through upper and lower bearings. The stator assembly shaft is joined to both upper and lower bearings along the inner race of each while the hub is affixed to the outer race of both the upper and lower bearings. When the coils of the stator are energized, the hub assembly and its permanent magnet members will rotate about the shaft.

A particular problem that is encountered in the use of such bearings is that, depending upon how the motor is assembled, the coupling between the rotary hub assembly and the stator assembly can be either too loose or too tight. If the bearings are too loose there is too much play in the hub assembly, and in tightly constructed configurations the hub assembly may actually be impeded in its attempt to rotate properly. On the other hand, if the bearings are too stiff there can be too much friction between the hub assembly and the stator, and the motor will not provide the necessary torque for the particular application.

Heretofore, the bearing stiffness that resulted from the way in which the hub and stator were joined together was largely a matter of chance because there was no attempt made to control the bearing stiffness during assembly. Whether the bearings were preloaded in any way was determined by the orientation of the parts when the glue joining the parts together set. This haphazard approach to motor assembly caused many motors to fail.

SUMMARY OF THE PRESENT INVENTION

The present invention provides a method and apparatus for assembling an electric motor where the motor includes a hub portion having an upper bearing comprising an inside race and an outside race and a shaft assembly portion which includes a rotor shaft extending through a lower bearing where the lower bearing also has an inside race and an outside race. A press fit machine maintains a predetermined amount of preload force on the bearings both while the two motor halves are press fitted together and for a short while afterwards while the glue sets.

According to this method, the hub assembly portion is placed in an upper press fixture and a predetermined preload weight is placed on the inner race of the upper bearing. At the same time the shaft assembly portion with anaerobic glue applied to the shaft is placed in a lower press fixture and a predetermined preload force is maintained on the inner race of the lower bearing. The shaft assembly portion and the hub assembly portion are pressed together by the press fixtures so as to join the two together. The hub portion is then disengaged from the upper press fixture while at the same time a preload weight is maintained on the inner race of the upper bearings for a predetermined period of time and the lower bearing is preloaded by its core weight. After the predetermined period of time the glue sets and the assembled motor is removed from the press fitting machine.

The press fitting machine includes a preload weight which is supported by support cylinders which are selectively actuated to allow the preload weight to rest on the inner race of the upper bearing. The lower fixture of the press fitting machine includes a spring-loaded mounting base which allows the weight of the core of the stator assembly to preload the lower bearing. The lower press fitting includes a spring-loaded chuck that raises the shaft slightly so that the core weight is suspended by the outer race of the lower bearing. The upper press fitting includes a vacuum chamber for holding the hub assembly and further includes an alignment piston for aligning the shaft of the stator assembly with the center of the hub assembly to guide the shaft through the upper bearing. A preload weight is supported on a cylinder that surrounds the alignment piston and which bears against the inner race of the upper bearing.

This apparatus insures that a preload force is maintained on the inner races of the upper and lower bearings during motor assembly. Once the motor is assembled it will be neither too loose nor too stiff as a result of the aforementioned preload being maintained during manufacture, before the glue joining the upper and lower halves of the motor has had time to set. Once the glue sets, the bearings will have the proper degree of stiffness.

DETAILED DESCRIPTION OF THE INVENTION

Figure 1:
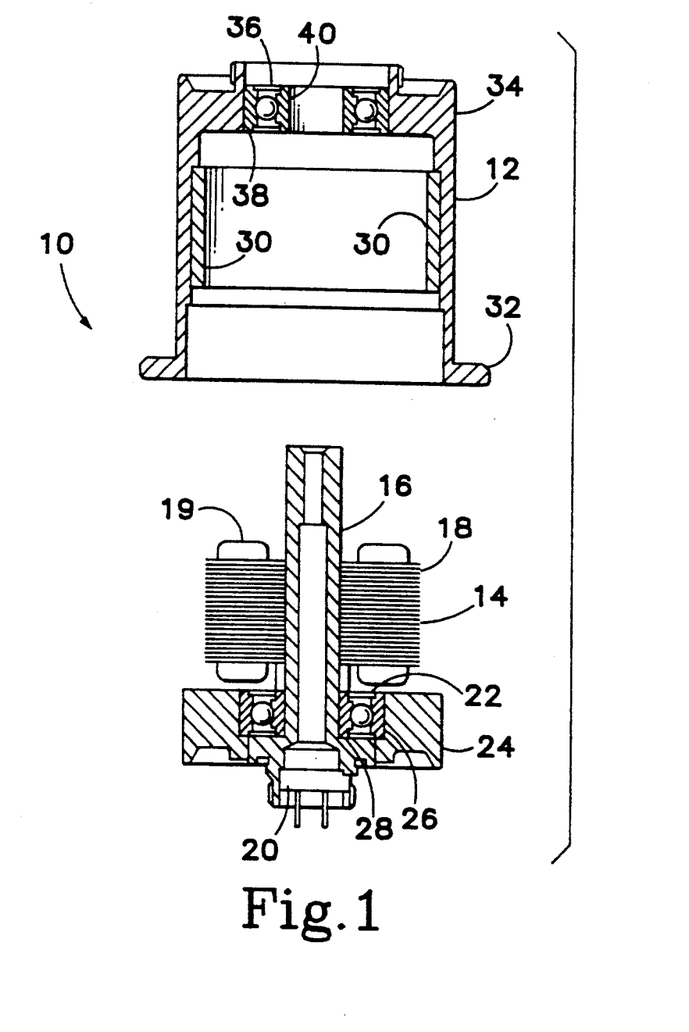
FIG. 1 is a side cutaway view of two halves of an electric motor to be assembled by means of the method and apparatus described herein.

Referring to FIG. 1, an electric motor 10, shown in two parts prior to assembly, comprises a hub assembly 12 and a stator assembly 14. The stator assembly 14 includes a central shaft 16 and stator coils 18 surrounding stator poles 19. The shaft 16 extends through the stator coils 18 to a connector 20 at which electrical connections are made which provide power and timing signals for control of the motor. The shaft assembly includes a lower bearing 22 which permits the rotation of a core portion 24 joined to an outer race 26 of the bearing 22. The inner race of the bearing 22 is joined to the shaft 16.

The hub assembly 12 includes permanent magnet members 30 and a lower flanged portion 32 which will join with the rotary core 24 once the hub assembly 12 is press fitted to the stator assembly 14. The hub assembly includes an essentially cylindrical housing 34 which is joined to a bearing 36 (hereinafter referred to as "the upper bearing)" at its outside race 38. The inner race 40 of the upper bearing 36 is intended to be joined to the rotor shaft 16 by glue or the like as will be described below.

Figure 2:
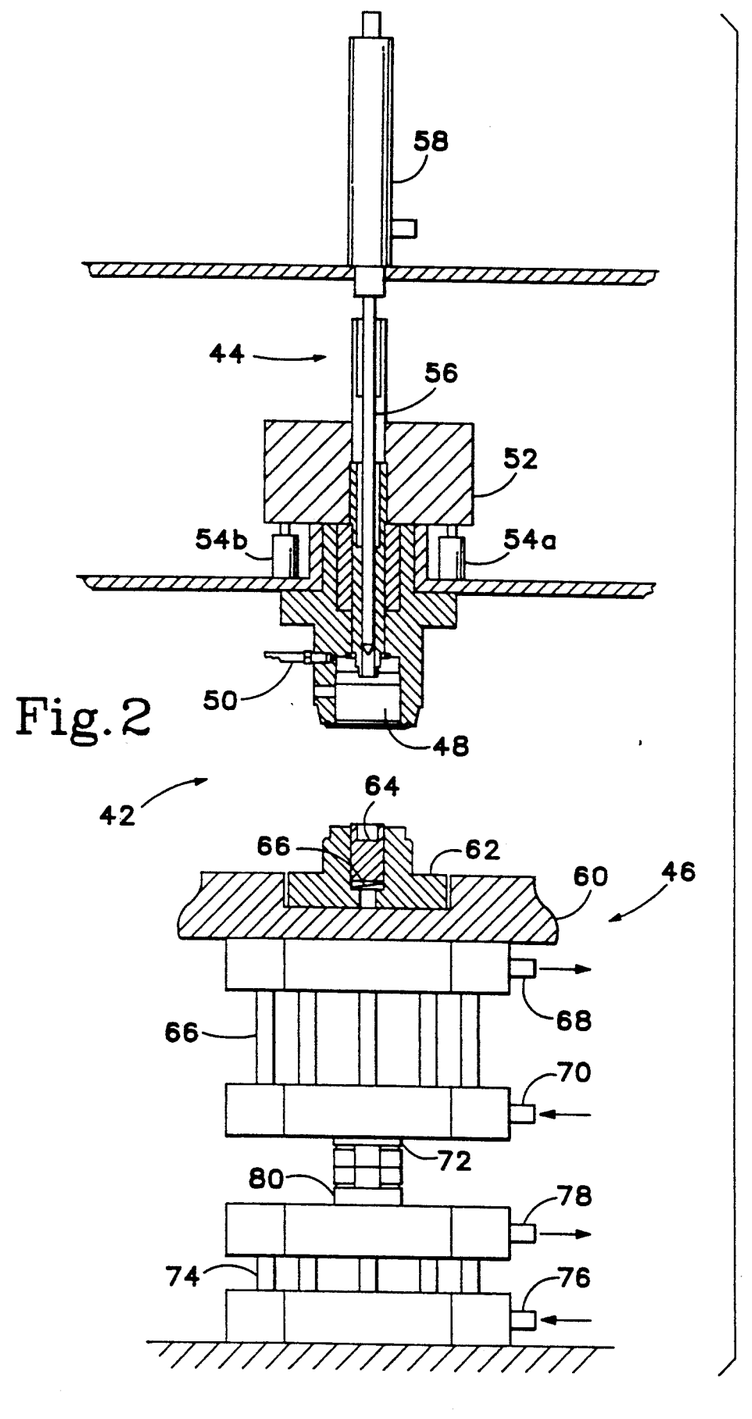
FIG. 2 is a side cutaway view of the motor assembly apparatus of the present invention.

Referring to FIG. 2, a press fit machine 42 includes an upper fixture 44 and a lower fixture 46. The upper fixture 44 includes a vacuum chamber 48 and a source of negative pressure 50 designed to hold the hub assembly 12 in the upper fixture 44 prior to assembly. The upper fixture 44 also includes a preload weight 52 and preload weight support cylinders 54a and 54b. An alignment piston 56 is controlled by an alignment cylinder 58.

The lower press fixture 46 includes an upper platform 60 which supports a stationary base 62. The stationary base 62 is rigid and does not move with respect to the platform 60. A cylindrical well inside the base 62 holds a spring-loaded chuck 64. The platform 60 rests on a frame 66 which houses an air intake line 68 and an air outlet line 70 for a press cylinder 72. In FIG. 2 the press cylinder 72 is shown in its retracted position, and the direction of air flow is shown by the arrows at the inlet line 68 and the outlet line 70. A second frame 74 houses air inlet and outlet lines 76 and 78, respectively, of a preload cylinder 80. In FIG. 2, the preload cylinder 80 is in the extended position. The arrows show the direction of air flow.

Figure 3:
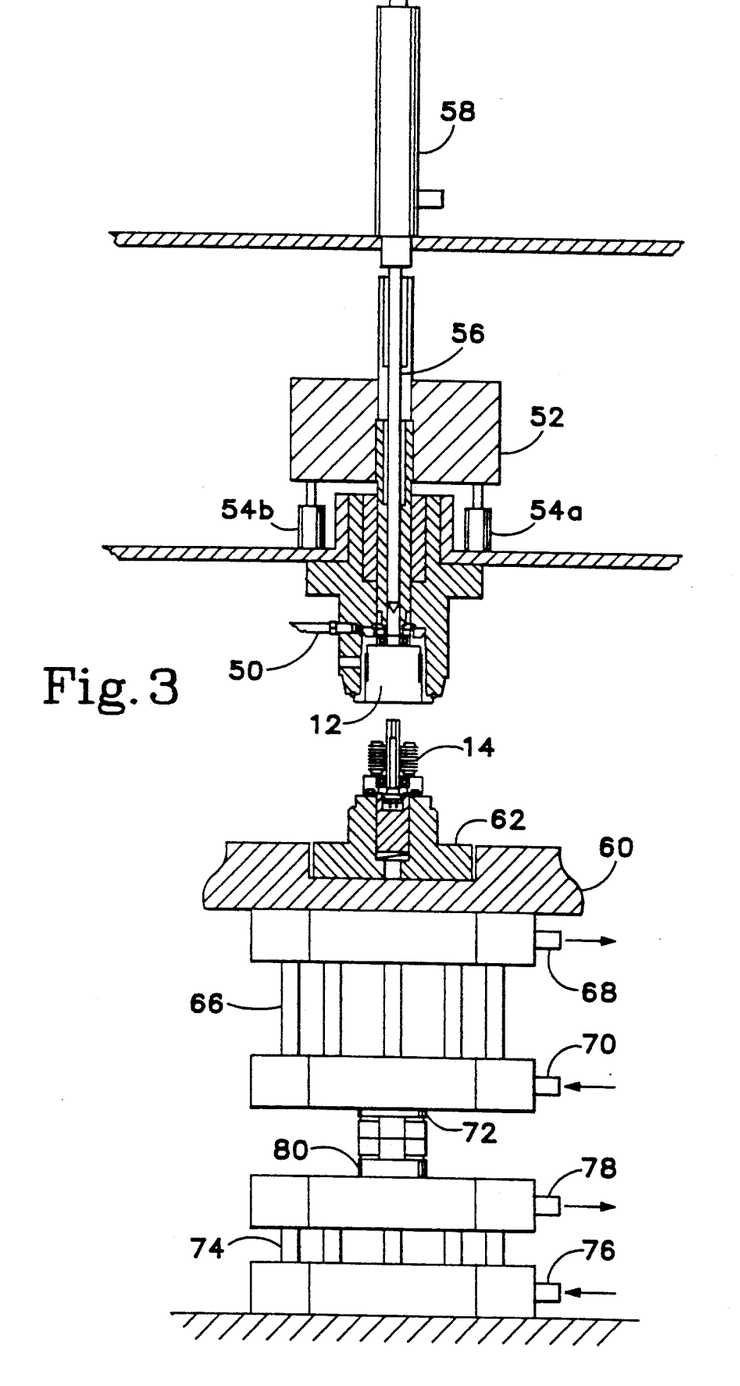
FIG. 3 is a side cutaway view of the motor assembly of FIG. 2 with the motor halves of FIG. 1 installed therein prior to assembly.

Referring now to FIG. 3, the first step in assembling the motor 10 is to load the hub assembly 12 into the vacuum chamber 48 of the upper press fixture 44. The vacuum line 50 is then vacuated which holds the hub assembly 12 in such a way that the preload weight 52 is pushed up by the hub assembly. This is shown in more detail in FIG. 8. The preload weight 52 is supported by a cylinder 82 which encloses the alignment piston 56 and which has a foot 84 of reduced radius that bears directly against the top of the inner race 40 of the upper bearing 36. The preload weight 52 weighs about three pounds, but the preload weight cylinders 54a and 54b relieve about two pounds of this weight with the result that a one-pound net force rests on the inner race 40. This preloads the bearing 36 while the two motor halves are being assembled, and prevents the shaft 16 from knocking the bearing 36 out of alignment. Also, the preload weight cylinders 54a, 54b are designed to relieve some of the magnetic attraction force otherwise occasioned by the proximity of the permanent magnets 30 to the stator coils 18 as the motor halves are brought together. The outer race 38 is pulled up with the rest of the hub assembly 12 by the vacuum force 50 to bear against an upper O-ring 86 and a lower O-ring 81.

Figure 8:
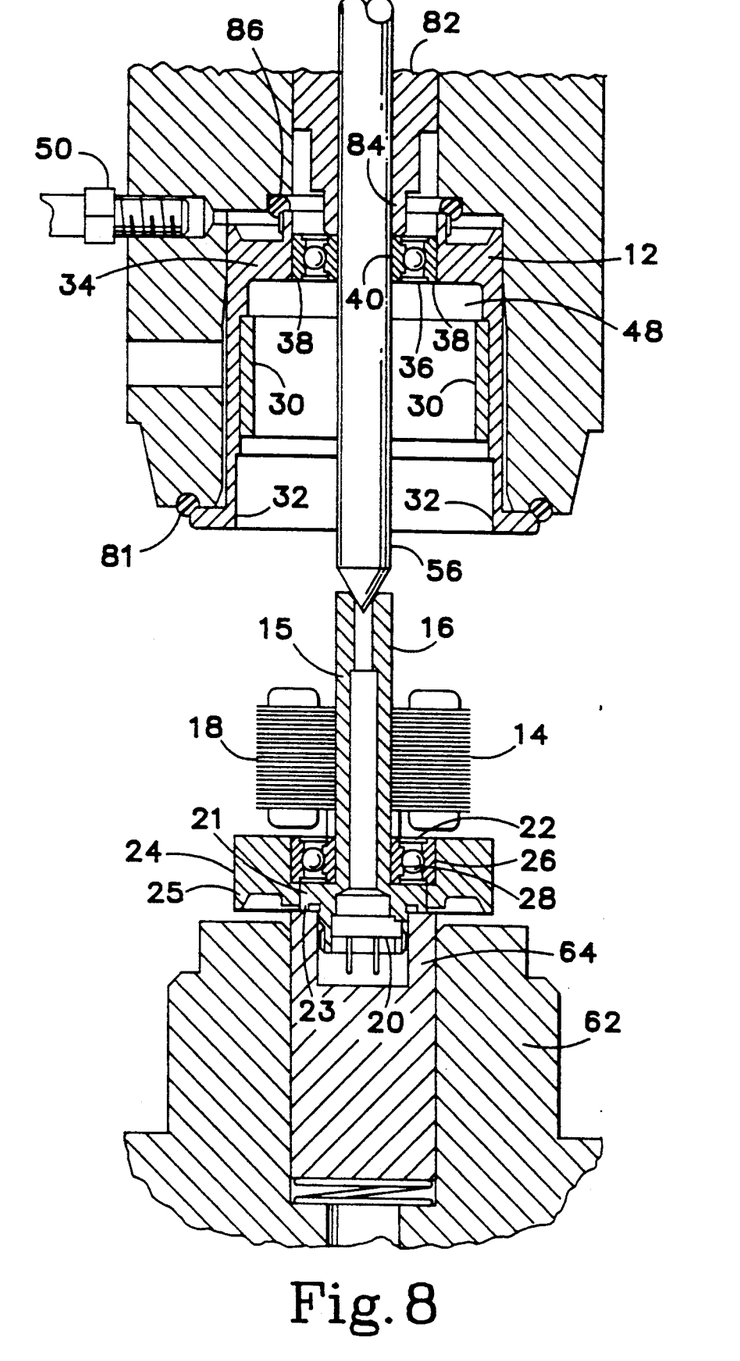
FIG. 8 is a partial side cutaway view showing in detail the shaft alignment step of FIG. 4.

The stator assembly 14 rests partially on the stationary support 62 and partially on the spring-loaded chuck 64. A central section 15, which includes the shaft 16 and the connector 20, also includes a flanged portion 21 which supports the inner race 28 of the bearing 22. As FIG. 8 shows, the flanged portion 21 is relieved radially outwardly of the inner race 28 so that it does no bear against the outer race of the bearing 26. The flanged portion 21 has a foot 23 that rests directly on top of the spring-loaded chuck 64. The rotary core portion 24 also has a foot 25 and this foot nearly rests on top of the stationary support 62, but because the chuck 64 is slightly raised with respect to the support 62, the weight of the core 24 bears down on the outer race 26 of the bearing 22. The rotary core 24 is connected to the outer race 26 and it rotates with respect to the central section 15.

Figure 4:
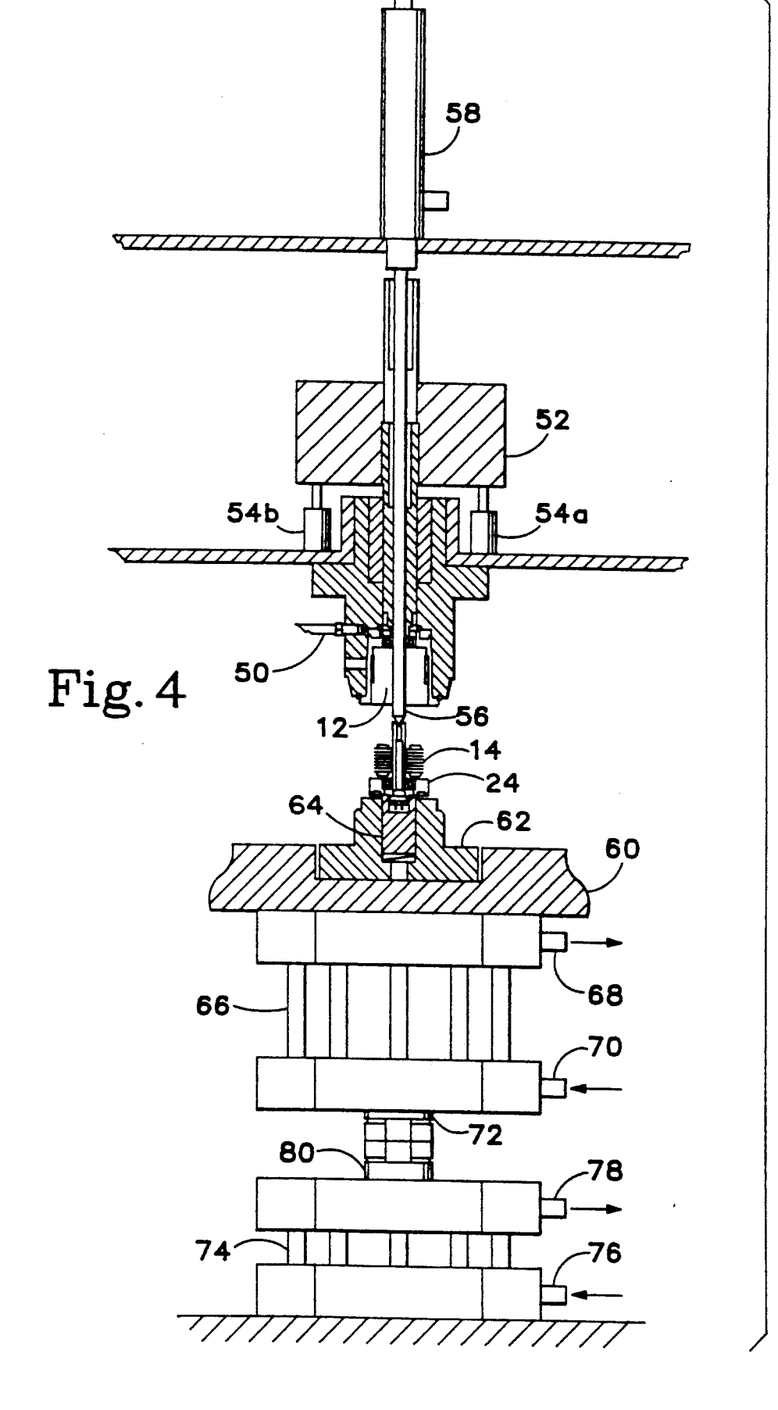
FIG. 4 is a side cutaway view of the motor and assembly apparatus of FIG. 3 with the motor shaft alignment piston extended.

FIG. 4 shows an expanded view of the apparatus shown in FIG. 8. In FIG. 4 the alignment piston 56 extends to engage the center of the shaft 16. This will guide the shaft through the upper bearing 36. At this time preload cylinder 80 is extended but the press cylinder 72 remains retracted.

Figure 5:
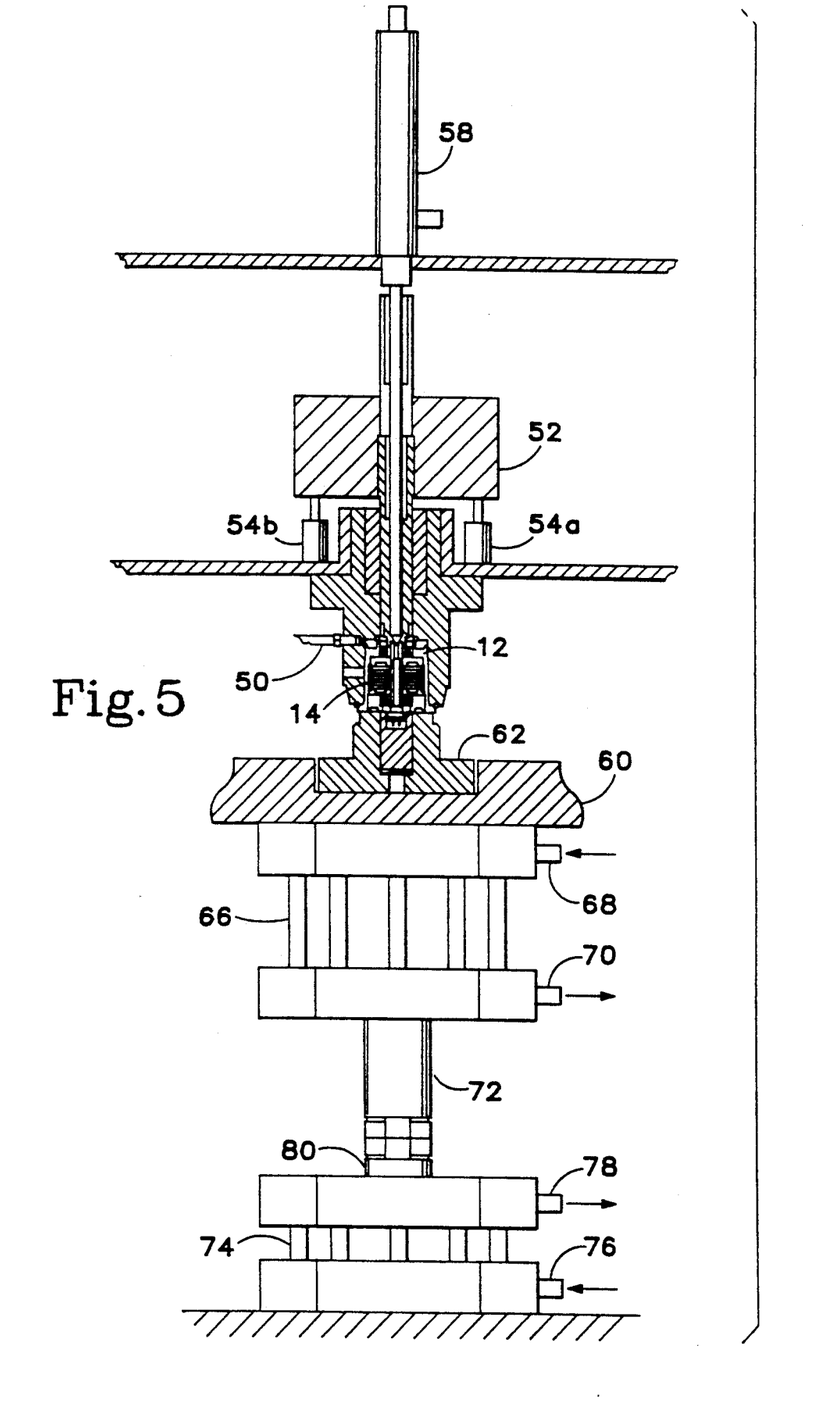
FIG. 5 is a side cutaway view of the motor assembly apparatus and motor showing the step of pressing the two halves of the motor assembly together.
Figure 6:
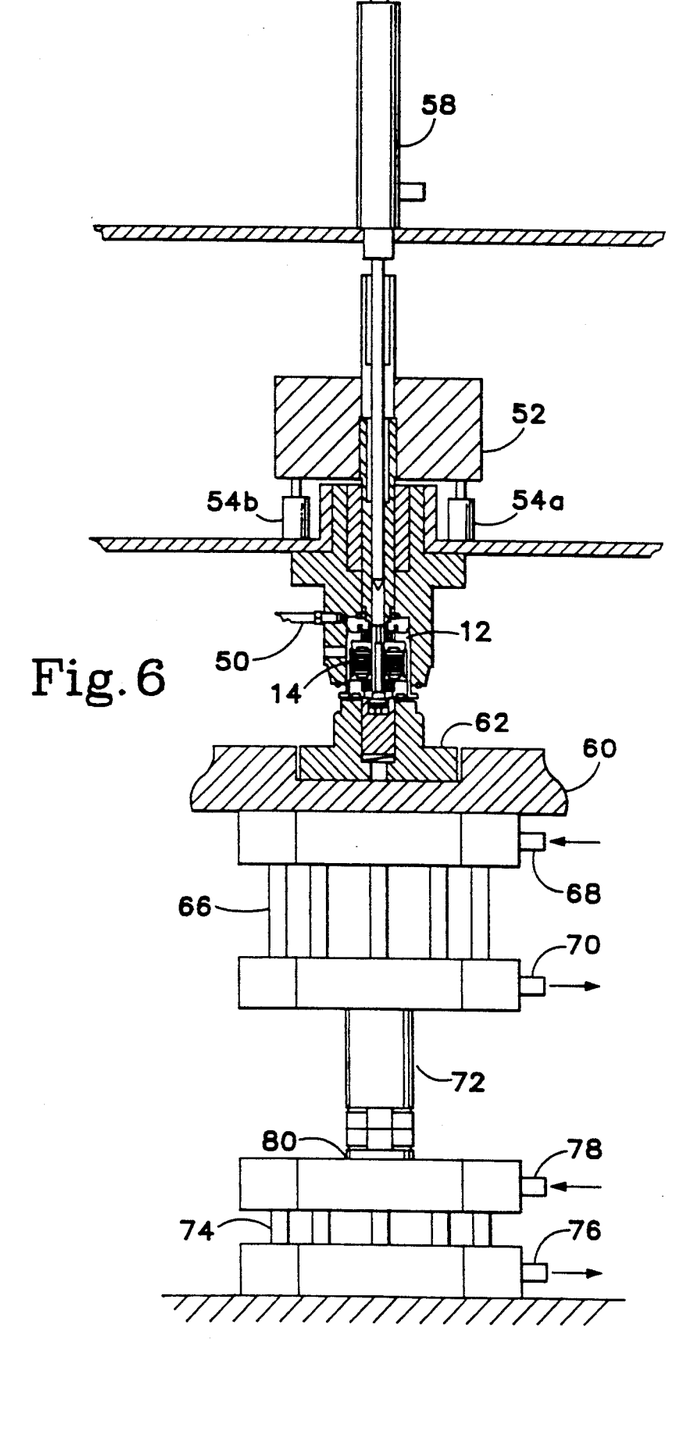
FIG. 6 is a side cutaway view of the motor and motor assembly machine of FIG. 5 illustrating the preload position for the motor assembly machine.
Figure 9:
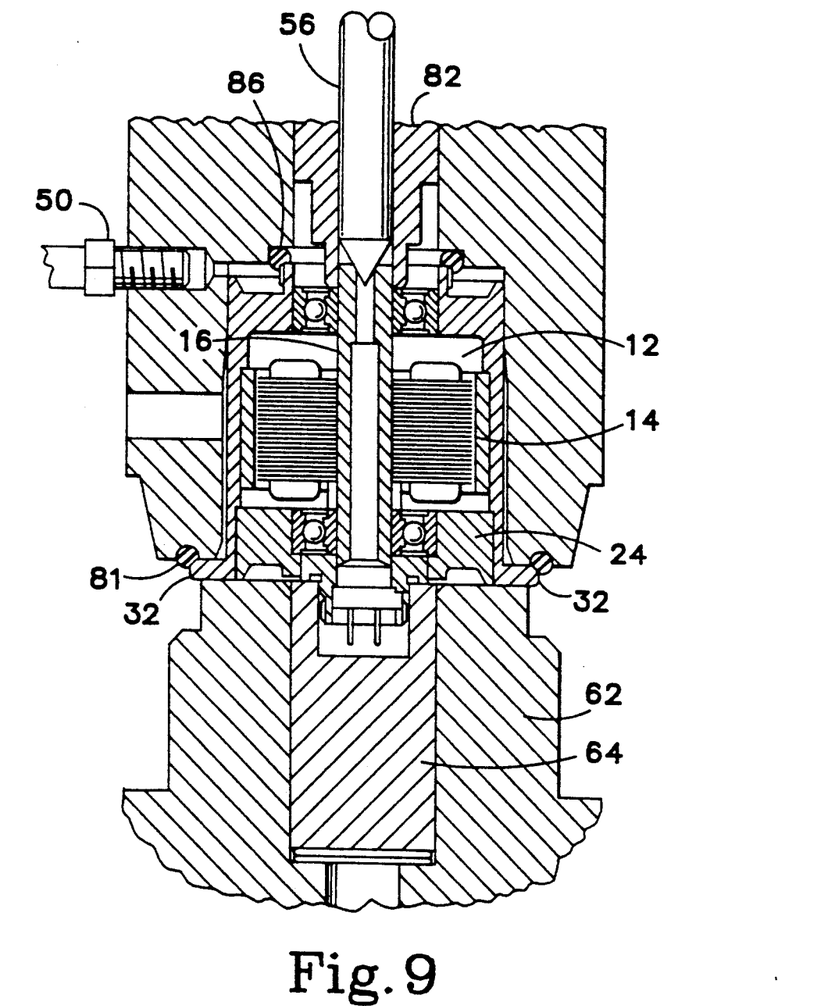
FIG. 9 is a partial side cutaway view illustrating in detail the press fitting step of FIG. 5.
Figure 10:
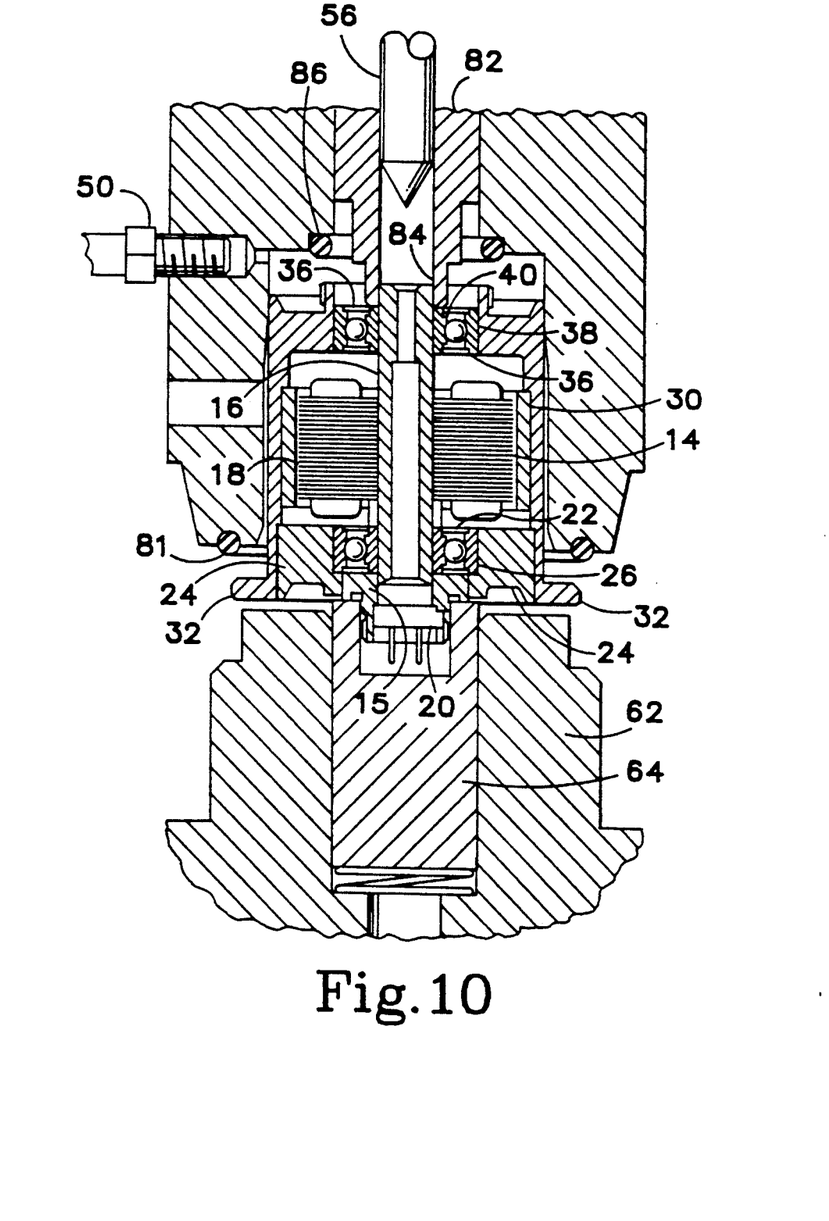
FIG. 10 is a partial side cutaway view illustrating in detail the preload step of FIG. 6.

Referring now to FIGS. 5 and 9, once the alignment cylinder 58 has caused the alignment piston 56 to engage the shaft 16, the two halves of the motor 10 may be press fitted together. In order to do this, the press cylinder 72 is extended. This cylinder will push the rotor shaft assembly 14 into the hub assembly 12 until the flanged portion 32 fully engages the stationary support 62. Once this occurs there will be zero pressure on the outlet side 70 of the cylinder 72 and the cylinder will halt.

Figure 7:
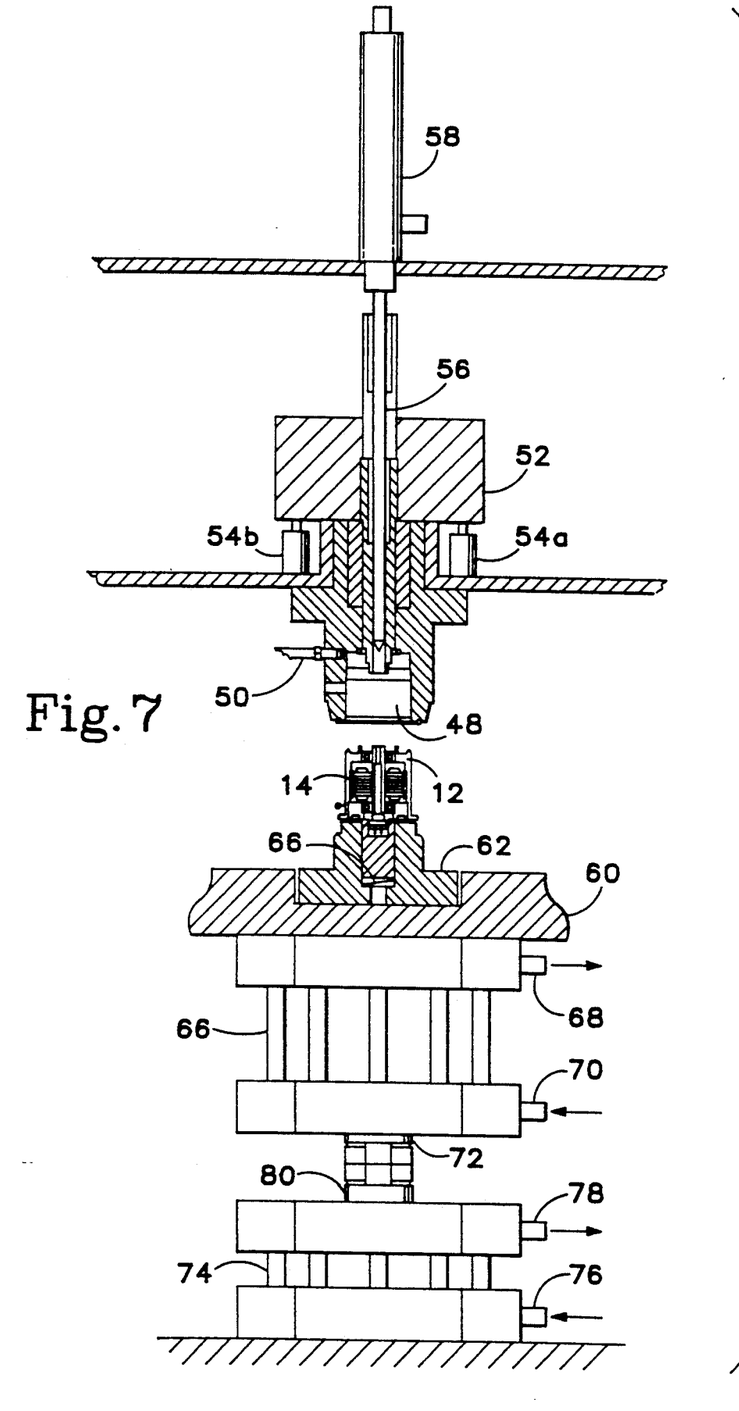
FIG. 7 is a side cutaway view of the motor assembly machine and motor llustrating the position of the motor assembly machine when a motor is completely assembled.
Figure 11:
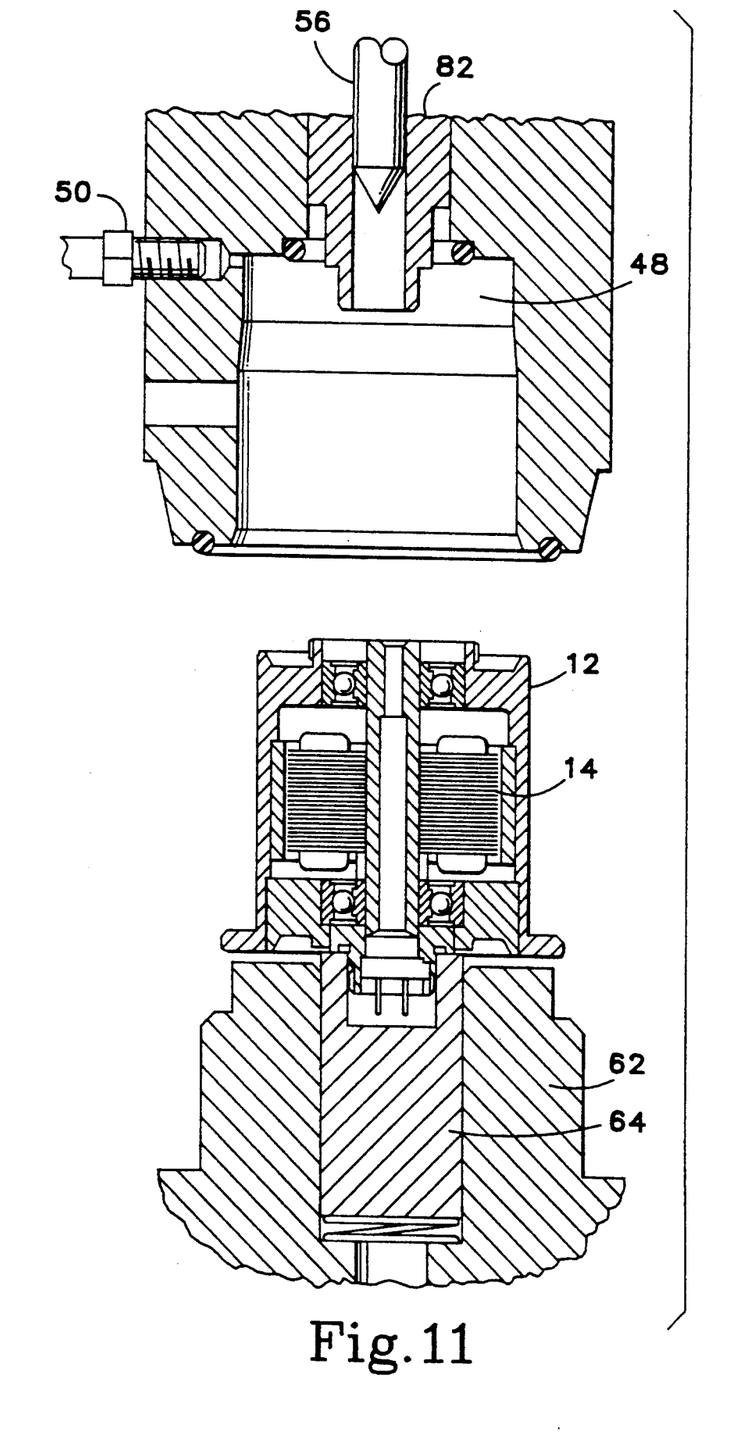
FIG. 11 is a partial side cutaway view illustrating the completed motor assembly shown more generally in FIG. 7.

Once the two halves of the motor are press fitted together, glue that has been placed on the outside of the rotor shaft 16 and on the outside of the rotary support 24 will begin to harden. The glue is applied prior to placing the motor 20 in the press fit apparatus. This is an anaerobic glue that will begin to set only when the surfaces to be joined are press fitted together. It is important that the upper and lower bearings remain preloaded with a predetermined amount of force while the hardening of the glue takes place. In order to accomplish this, the vacuum source 50 is turned off and the preload cylinder 80 retracts. At the same time this occurs, the preload weight cylinders 54a and 54b retract allowing the entire amount of the preload weight 52 to be borne by the inner race 40 of the upper bearing 36. With the preload cylinder 80 retracted, the weight of the hub assembly which is affixed to the core 24 weights the outer race 26 of the lower bearing 22 because the spring-loaded chuck 64 lifts the central section 15 so that the foot of the core 24 is slightly above the stationary support 62. The bearings remain in this preloaded condition for about 15 seconds while the glue sets. Finally, as shown in FIGS. 11 and 7, the press cylinder 72 may be retracted allowing the motor to be removed. This resets all cylinders so that the machine is ready for the next motor.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of assembling an electric motor, said motor including a hub assembly portion having an upper bearing, said bearing having an inside race and an outside race, and a stator assembly portion having a rotor shaft extending through a lower bearing, said lower bearing having an inside race and an outside race, comprising the steps of:
   (a) placing the hub assembly portion in a first press fixture;
   (b) placing the stator assembly portion in a second press fixture;
   (c) impressing a first preload force on the upper bearing of the hub assembly portion;
   (d) impressing a second preload force on the lower bearing of the stator assembly portion;
   (e) pressing the first and second press fixtures together thereby joining the hub assembly portion to the stator assembly portion; and
   (f) maintaining third and fourth preload forces, respectively, on the upper and lower bearings for a predetermined period of time.

2. The method of claim 1 wherein at least a portion of said first and second preload forces are maintained on their respective bearings during step (e).

3. The method of claim 1 wherein the first preload force is impressed on the inner race of the upper bearing.

4. The method of claim 3 wherein the second preload force is impressed on the outer race of the lower bearing.

5. The method of claim 1 wherein the third preload force is maintained on the inner race of the upper bearing and the fourth preload force is maintained on the outer race of the lower bearing.

6. The method of claim 1 further including the step of applying an anaerobic glue to selected surfaces of the hub portion and the stator portion prior to executing step (a).

7. The method of claim 6 wherein the predetermined period of time of step (f) is selected to be sufficiently long to allow the anaerobic glue to cure.

8. A press fit machine for assembling an electric motor, said electric motor including a hub portion having an upper bearing and a stator portion having a lower bearing. Said upper bearing and said lower bearing each including an inside race and an outside race, respectively comprising:
   (a) an upper fixture for holding the hub portion, said upper fixture including means for impressing a preload force on the upper bearing;
   (b) a lower press fit fixture for holding the stator portion, said lower fixture including means for impressing a preload force on the lower bearing;
   (c) a press cylinder for pushing the upper and lower fixtures together; and
   (d) means for holding said respective upper and lower bearings in a preloaded condition for a predetermined period of
   time subsequent to pushing the upper and lower fixtures together.

9. The press fit machine of claim 1 wherein the means for impressing a preload force on the upper bearing includes a preload weight which bears against an inner race of said upper bearing.

10. The press fit machine of claim 8 wherein said stator assembly comprises a central section including a shaft journalled through said lower bearing and affixed to an inner race thereof and a rotary core portion affixed to an outer race of said lower bearing, the central section of said stator assembly being held in a chuck in the lower press fit fixture whereby the weight of the rotary core impresses the preload force on said outer race of said lower bearing.

11. The press fit machine of claim 9 further including preload weight support cylinders for relieving at least a portion of said preload weight while said upper and lower press fit fixtures are pushed together with the press cylinder.

12. The press fit machine of claim 8 wherein said upper press fit fixture includes vacuum means for holding the hub portion therein prior to assembly of the electric motor.

* * * * *

UNITED STATES PATENT AND TRADEMARK OFFICE
CERTIFICATE OF CORRECTION

PATENT NO. : 5,272,803
DATED : December 28, 1993
INVENTOR(S) : Richard Harrison and Lei Sun It is certified that error appears in the above-indentified patent and that said Letters Patent is hereby corrected as shown below:

Column 2, line 56 delete "ilustrating" and insert --illustrating--.

Column 3, line 22 delete ")" and insert --")--;
        line 65 after"54a," insert space before 54b.

Column 4, line 10 delete "no" and insert --not--;
        line 53: insert commas after "hub assembly" and after "core 24".

Signed and Sealed this

Twelfth Day of July, 1994

Attest:

BRUCE LEHMAN

*Attesting Officer*      *Commissioner of Patents and Trademarks*